(12) United States Patent  
Shao

(10) Patent No.: US 9,219,414 B2  
(45) Date of Patent: Dec. 22, 2015

(54) LOAD CURRENT READBACK AND AVERAGE ESTIMATION

(71) Applicant: Analog Devices Global, Hamilton (BM)

(72) Inventor: Bin Shao, Shanghai (CN)

(73) Assignee: Analog Devices Global (BM)

( * ) Notice: Subject to any disclaimer, the term of this patent is extended or adjusted under 35 U.S.C. 154(b) by 135 days.

(21) Appl. No.: 14/064,490

(22) Filed: Oct. 28, 2013

(65) Prior Publication Data

US 2015/0115923 A1    Apr. 30, 2015

(51) Int. Cl.
| | |
|---|---|
| G05F 1/56 | (2006.01) |
| H02M 3/158 | (2006.01) |
| H02M 3/157 | (2006.01) |
| H02M 1/00 | (2007.01) |

(52) U.S. Cl.  
CPC .............. *H02M 3/158* (2013.01); *H02M 3/157* (2013.01); *H02M 2001/0009* (2013.01)

(58) Field of Classification Search  
USPC ........................... 323/282–285, 289, 351, 266  
See application file for complete search history.

(56) References Cited

U.S. PATENT DOCUMENTS

| | | | | | |
|---|---|---|---|---|---|
| 3,978,393 | A | * | 8/1976 | Wisner et al. ................... | 323/272 |
| 5,969,515 | A | * | 10/1999 | Oglesbee ........................ | 323/283 |
| 6,621,256 | B2 | * | 9/2003 | Muratov et al. ................ | 323/282 |
| 7,023,182 | B1 | * | 4/2006 | Kleine et al. ................... | 323/212 |
| 7,592,791 | B2 | * | 9/2009 | Emira ............................. | 323/283 |
| 2005/0200341 | A1 | * | 9/2005 | Kohout et al. ................. | 323/282 |
| 2006/0061342 | A1 | * | 3/2006 | Bernacchia et al. .......... | 323/282 |
| 2009/0146634 | A1 | | 6/2009 | Audy | |

OTHER PUBLICATIONS

"AN 10322 Current sensing power MOSFETS", Rev. 02—Application Note. (c) NXP B.V. 2009, (Jun. 24, 2009), 10 pgs.

* cited by examiner

*Primary Examiner* — Adolf Berhane  
*Assistant Examiner* — Nusrat Quddus  
(74) *Attorney, Agent, or Firm* — Schwegman Lundberg & Woessner, P.A.

(57) ABSTRACT

A switching regulator or other apparatus or techniques can include load current monitoring to provide a digital representation of an estimated load current. Load current monitoring can be performed by a circuit including a counter circuit, a comparator circuit, and a digitally-controlled source coupled to the counter circuit and configured to adjust a bias condition of a sensing device in response to a count provided by the counter circuit in order to establish a proportional relationship between a current conducted by the sensing device and a corresponding current conducted by a power switching device. The counter circuit is configured to increment and decrement the count in response to information provided by the comparator output and the count is generally indicative of the estimated load current, such as an average load current.

20 Claims, 14 Drawing Sheets

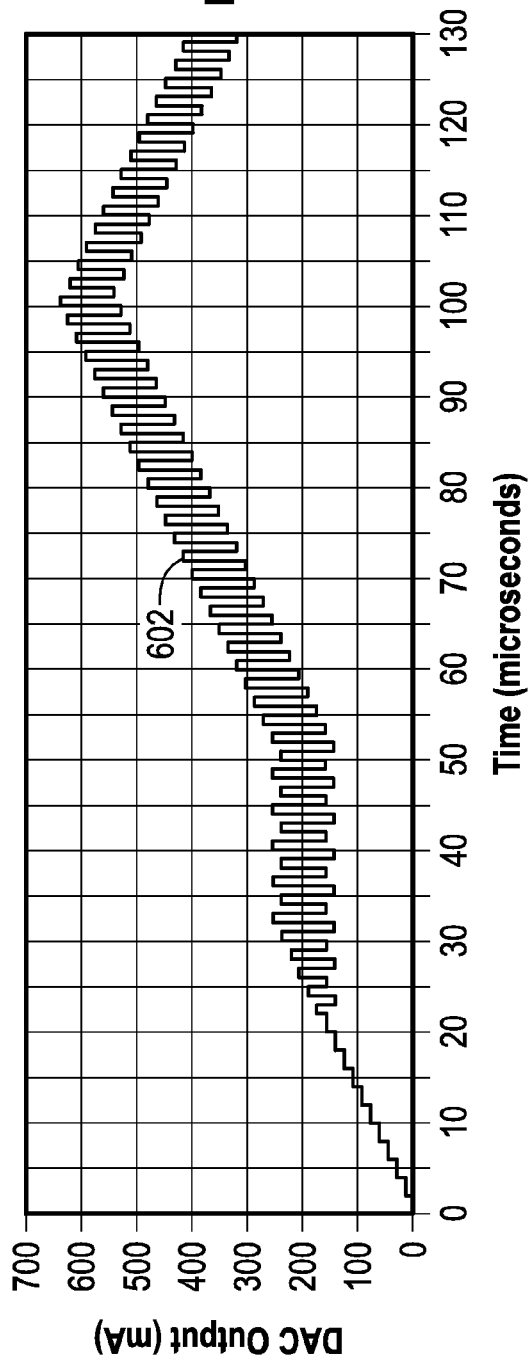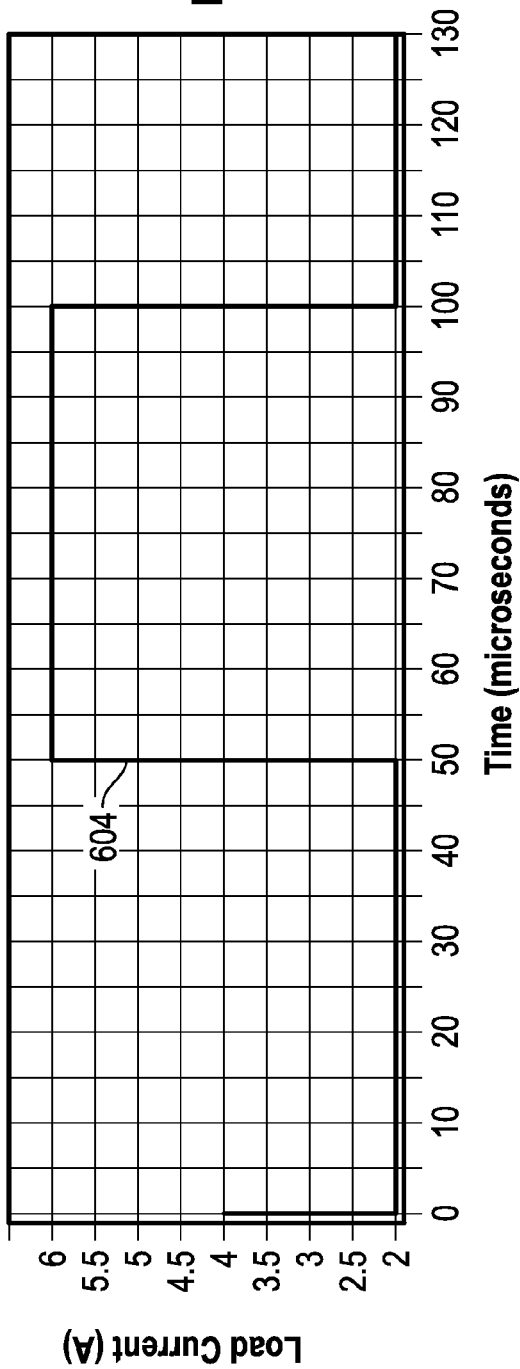

LOAD CURRENT READBACK AND AVERAGE ESTIMATION

BACKGROUND

Power conversion circuits are used in a wide variety of applications. For example, in some applications, a power conversion circuit receives energy from another circuit or from an energy source such as a battery and uses the received energy to provide an output having specified characteristics across a range of conditions. For example, an energy source can supply rectified alternating current or direct current (DC) in a specified voltage range as an input to the power conversion circuit, and an output of the power conversion circuit can include a DC output within a specified output voltage range. Such a power conversion circuit can be referred to as a DC/DC converter.

When a magnitude of the output voltage is larger than a magnitude of input voltage, the converter is referred to as a boost converter. Likewise, when the output voltage magnitude is below the input voltage magnitude, the converter is referred to as a buck converter. Other configurations are possible, such as to provide an output voltage magnitude that can be above or below the magnitude of the input voltage range (e.g., buck/boost or inverting configurations).

DC/DC conversion circuits can also provide regulation of an output parameter (e.g., an output voltage) to constrain the output parameter within a desired range. For example, regulation can be performed using a dissipative element such as a series element or a shunt element. The dissipative element can be controlled by an error signal, such as provided by an amplifier configured to compare information indicative of the regulated output parameter against a reference. Such a closed-loop configuration with a dissipative element can generally be referred to as a "linear" supply configuration because the dissipative element will generally be operated in a "linear" region where the state of the dissipative element varies across of a range of dissipation levels such as proportionally with respect to the error signal, in response to changing conditions such as load current demand, input fluctuation, or temperature, for example.

In another approach, a DC/DC conversion circuit can provide regulation of an output parameter (e.g., voltage), using a switched configuration whereby energy is stored in an intermediate energy storage element during a first interval, and the energy is then transferred to a load during a second interval, using one or more series or shunt switching devices configured to operate in a highly-conducting mode (e.g., a saturated or switched-on state) or in a non-conducting mode (e.g., a cut-off or blocking state). The energy storage element can include one or more of a capacitor or an inductor. Regulation can be achieved in switched-mode DC/DC converters, such as in response to feedback by varying one or more of a pulse width or a pulse frequency of signals used to control switching elements in the switched-mode converter, or using other techniques.

OVERVIEW

A DC/DC conversion circuit can include a current monitoring capability, such as to provide information indicative of a load current. In one approach, the load current can be monitored using a series element such as a resistor. The resistor is generally located separately from a monolithic integrated circuit that includes other portions of the DC/DC converter. The voltage developed across the resistor can be monitored and is proportional to the current flowing through the resistor. Using a series resistor (or other similar passive dissipative element) as a current sensor presents at least two issues. First, the resistance value is generally limited to prevent excessive dissipation of energy in the current-sensing resistor (degrading efficiency), but use of a small-valued resistor limits current measurement accuracy because the corresponding voltages developed across the resistor are generally quite small. Second, the resistor is generally a discrete precision resistor, taking up substantial physical space in terms of footprint or volume and adding to system cost. In some cases, the resistor component cost can outweigh a cost of a monolithic integrated circuit including other portions of the DC/DC converter.

When a transistor-based switching scheme is used, a DC/DC converter can include a circuit having two transistors including a power transistor arranged to carry a majority of the load current through a primary current path, and a sensing transistor arranged to carry a sensing current that is proportional to the load current carried by the primary current path when a specified bias condition is maintained. A load current can then be estimated using information provided by this transistor configuration rather than relying on a series resistor.

For example, a bias condition for the sensing transistor can be adjusted using information about the power transistor state to maintain a specified proportionality between the sensing transistor current and power transistor current, in a manner similar to a mirror circuit configuration. In one approach, maintaining such a bias condition can include using an amplifier-based feedback scheme where the bias condition of the sensing transistor is continuously adjusted. For example, information indicative of a voltage drop across the sensing transistor can be measured and fed into a differential amplifier along with information indicative of a voltage drop across the power transistor.

The differential amplifier can provide an output indicative of a difference between the two voltage drops. In response, the bias condition of the sensing transistor, such as a current, can be adjusted to reduce or minimize an error between the two voltage drops. Under this error reduction or minimization condition, information about the sensing transistor current provides an indication of load current. However, the present inventor has recognized that such an amplifier-based scheme can also present issues, such as having higher current consumption as compared to other approaches presented herein. Also, if an estimate of an average load current or other central tendency is desired, an output from the amplifier-based scheme would generally need to be further processed in the analog or digital domain. For example, if the load current is to be monitored by a digital system, an additional analog-to-digital converter can also be needed using the amplifier-based approach.

In contrast, the present inventor has, among other things, developed a mixed-signal comparator-and-counter configuration that can be used to monitor a power switching device and a sensing device to maintain a bias condition in the sensing device so that a current through the sensing device is adjusted to track a current through the power device proportionally. For example, the comparator can be configured to compare voltages obtained from the power switching device and the sensing device during a specified duration or instant, and in response adjust a bias condition of the sensing device using a digital output of the counter. Such a digital output also provides a convenient digital representation of the load current corresponding to the duration or instant of sampling, such as without requiring a separate analog-to-digital converter.

The present inventor has also recognized that an estimated mid-point of the dump-cycle of a switching converter provides a convenient estimate of average load current, which can be "readback" digitally using the output of the counter, without requiring use of a separate analog-to-digital converter. In particular, a mid-point of the load current provided from an energy storage device during energy transfer to the load (e.g., a dump cycle of the switching converter) can be estimated. Sampling of the voltages at or across the primary switching device and sensing device can be triggered, such as using information about the estimated mid-point of the load current.

In an example, a switching regulator apparatus can be used to provide a digital representation of an estimated load current. The switching regulator apparatus can include a first counter circuit including and input and a digital output, and a comparator circuit including a first input selectively coupleable to a power switching device, the power switching device configured to conduct current for delivery to the load, a second input selectively coupleable to a sensing device, and an output coupled to the input of the first counter circuit. The switching regulator apparatus can include a digitally-controlled source coupled to the output of the first counter circuit and configured to adjust a bias condition of the sensing device in response to a first count provided by the first counter circuit in order to establish a proportional relationship between a current conducted by the sensing device and a corresponding current conducted by the power switching device. The counter circuit can be a bidirectional digital counter configured to increment or decrement in response to information provided by the comparator output about a comparison between the first and second inputs of the comparator, and to provide a count indicative of the estimated load current, such as under a condition of a constant load, or after a series of successive cycles of comparison and incrementing or decrementing the first count.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 6A and 6B illustrate generally an example of a simulation of the circuit configuration shown in FIG. 5, such as in response to a discontinuous load current.

DETAILED DESCRIPTION

Figure 1:
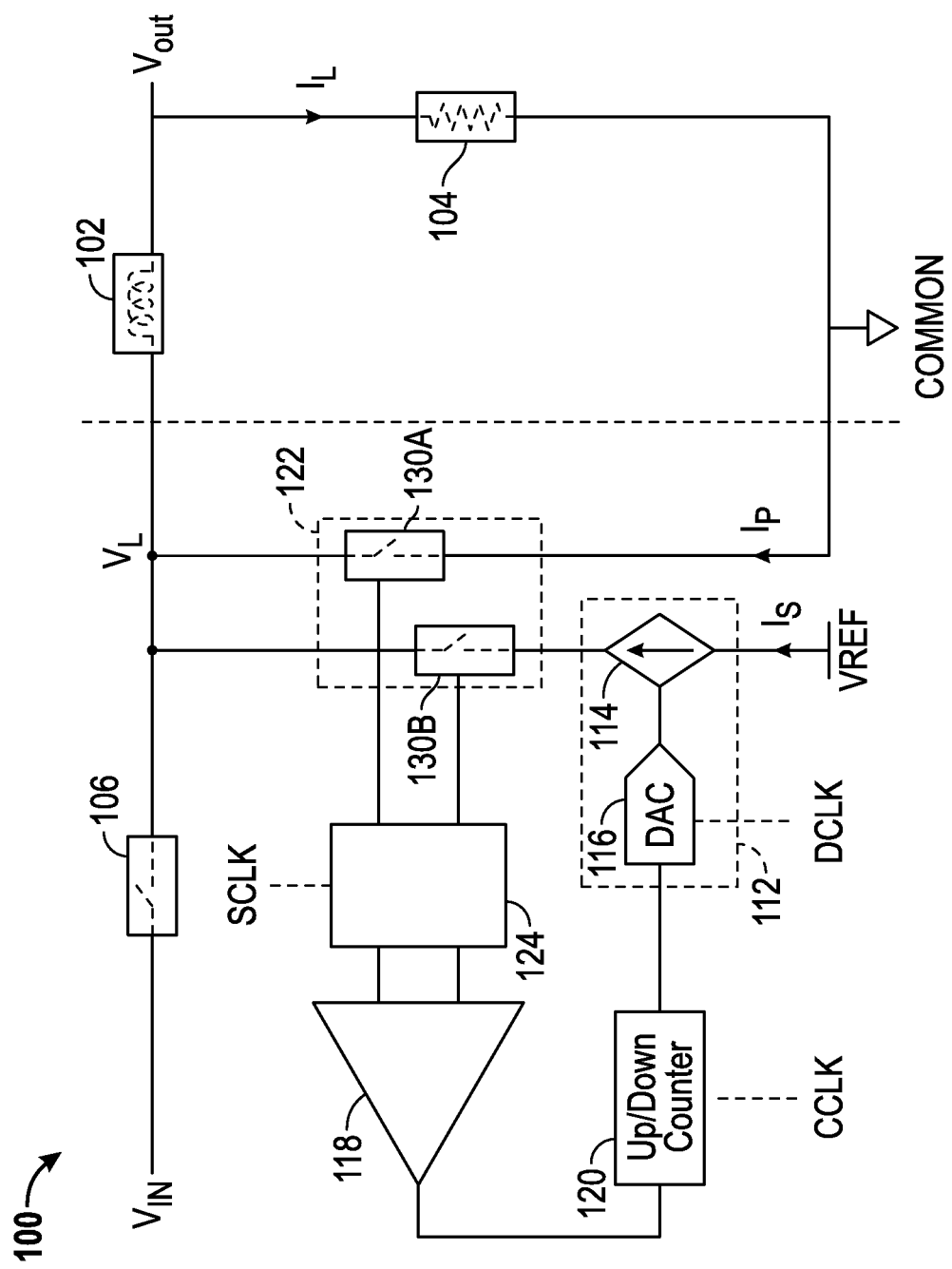
FIG. 1 illustrates generally an example showing a portion of a direct-current-to-direct-current (DC/DC) switching regulator circuit.

FIG. 1 illustrates generally an example showing a portion of a direct-current-to-direct-current (DC/DC) switching regulator circuit 100. In the illustrative example of FIG. 1, an energy storage device 102 can be repeatedly charged and discharged, such as using a series power switching device 106, and a shunt power switching device 130A. In the examples described in this document, the energy storage device 102 can include an inductor, or a transformer, for example, or another kind of energy storage device such as a capacitor. During a charging phase, the series power switching device 106 can couple an input, such as input node $V_{IN}$, to the energy storage device 102, such as in response to a switch control signal, while the shunt power switching device 130A is open circuited or in a cut-off state.

In response to feedback, or according to a fixed or variable timing scheme such as using pulse frequency modulation or pulse width modulation, the series power switching device 106 can then be open-circuited or placed in an off-state, and the shunt power switching device 130A can couple the node $V_L$ of the energy storage device 102 to a common node, COMMON. During this "dump" or discharge phase, the energy storage device 102 can transfer energy to a load 104, causing a load current, $I_L$, to flow through a path including the energy storage device 102, the shunt power switching device 130A, and the load 104. The charge and dump phases can be established using a control circuit, such as to provide an output voltage $V_{OUT}$ within a specified output voltage range across a wide variety of input voltage $V_{IN}$ and load conditions, for example. The configuration shown in FIG. 1 is generally referred to as a "buck" switching regulator configuration having an "active" rectification scheme. However, the examples herein are generally applicable to other switching regulator topologies, and the use of a buck configuration in this example is merely for purposes of illustration.

A current flowing the shunt power switching device 130A, $I_P$, can be about equal to the load current, $I_L$. Accordingly, a sensing current, $I_S$ can be established, such as proportional to $I_P$ but having a specified scaling factor, such as to provide a sensing current $I_S$ that is 100, 200, or 1000 times smaller than $I_P$, flowing through a sensing device. In an illustrative example, such as discussed in relation to FIGS. 2-3 and 5, and in other examples, the shunt power switching device 130A and the sensing device 130B can be transistors, such as Field Effect Transistors (FETs). Such a pair of devices 122 can be included in commonly-shared integrated circuit or a commonly-shared integrated circuit package as discussed below in the examples of FIGS. 2-3 and 5, and elsewhere.

In an example, a portion of the shunt power switching device 130A can be coupled to a first input of a comparator circuit 118, and a portion of a corresponding sensing device 130B can be coupled to a second input of the comparator circuit 118, such as through a sampling circuit 124, in response to a sample event trigger signal SCLK. In this manner, an interval between successive sampling events need not be as small as an interval between successive switching events of each of the power switching devices 106 and 130A (e.g., a switching frequency of the circuit 100 can be higher than a sampling frequency). The output of the comparator circuit 118 can provide information indicative of whether a sampled electrical parameter of the shunt power switching device 130A is greater or lesser than a corresponding sampled electrical parameter of the sensing device 130B. For example, such an electrical parameter can include a voltage drop across switched terminals of the shunt power switching device 130A or the sensing device 130B. Such information from the output of the comparator circuit 118 can be used to increment or decrement a counter circuit, such as an up/down (e.g., bidirectional) counter circuit 120. Such a counter circuit 120 can be edge triggered by a signal from the comparator circuit 118 or can be synchronously triggered or enabled by a signal, CCLK. For example, the counter circuit 120 can be enabled, such as by CCLK, and can then be edge or level triggered by the output of the comparator circuit 118. Or, for example, the counter circuit 120 can be gated by CCLK to increment or decrement in response to a level present at the input of the counter circuit 120.

A digital value from the output of the counter circuit 120 can provide information indicative of an instantaneous load current, $I_L$, such as during an interval established using the sampling circuit 124, because the output of the counter circuit 120 is used to establish the sensing current $I_S$, which is kept roughly proportional to the current through the shunt power switching device 130A, $I_P$. During successive sampling cycles, the counter circuit 120 can be incremented or decremented in order to adjust a bias condition of the sensing device 130B so that the current $I_S$ converges on a value proportional to the current $I_P$, such as by minimizing or reducing an error indicated by the comparator circuit 118 output. For example, the error can include a difference between a sampled electrical parameter (e.g., a voltage drop) obtained from the shunt power switching device 130A and an electrical parameter (e.g., a voltage drop) obtained from sensing device 130B.

The sensing current $I_S$ can be sourced using a digitally-controlled source 112 such as coupled to a reference node, VREF, separate from the COMMON node. The digitally-controlled source 112 can include a digital-to-analog converter (DAC) 116, such as coupled to an adjustable current source 114. The DAC 116 can operate synchronously or asynchronously to establish an analog output (e.g., a voltage or current) in response to the digital output of the counter circuit 120. For example, the DAC 116 can latch an input code in response to a DAC clock signal, DCLK.

The present inventor has recognized, among other things, that the comparator circuit 118 need not be a high-speed comparator because sample events do not need to occur during every switching cycle of the switching regulator. For example, if the switching regulator is configured to operate using a switching repetition rate of about 1 megahertz (MHz) or more, a sample event trigger signal can be generated at a far lower rate, such as only once every 10 cycles or only once every 100 cycles, as illustrative examples. Also, the combination of the comparator circuit 118, the sampling circuit 124, the counter circuit 120, and the digitally-controlled source 112 generally provide an energy-efficient sample-and-hold circuit configuration that does not require a large storage capacitor (e.g., for storing an analog representation of the comparator output or for storing analog representations of the electrical parameters provided to the comparator circuit 118 inputs), nor does the configuration shown in FIG. 1 require a high-speed amplifier. For example, because the VREF node is at a different potential than the COMMON node, no servo loop is required to force VREF to the same potential as the COMMON node.

Figure 2:
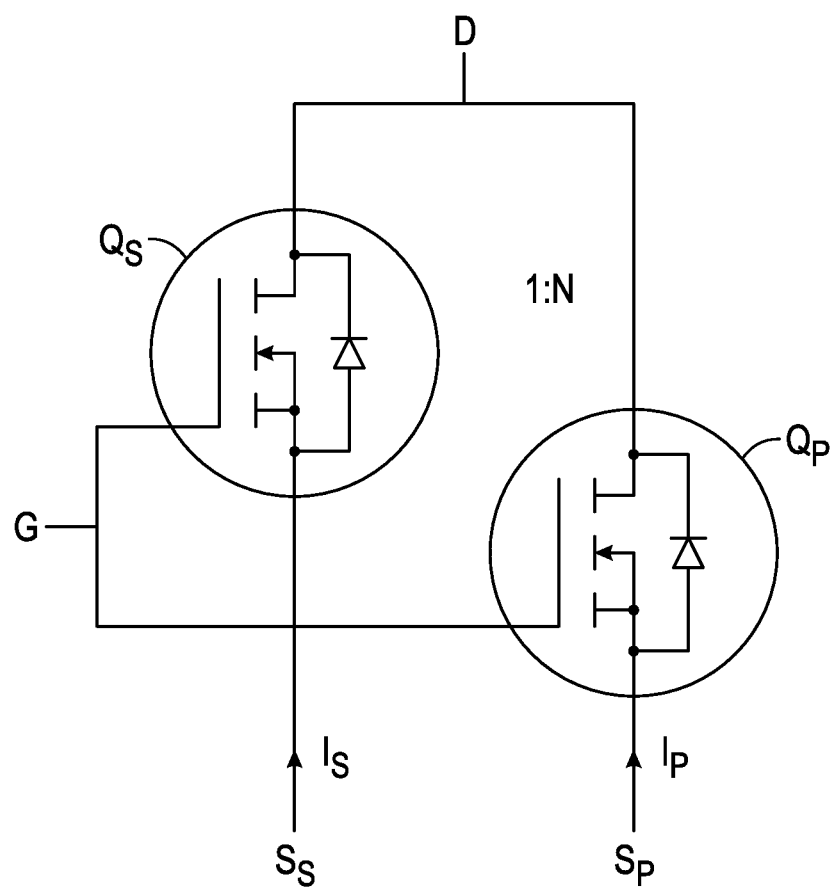
FIG. 2 illustrates generally an illustrative example of a SenseFET circuit configuration, such as can be included in the examples of FIG. 1 or FIG. 3.
Figure 3:
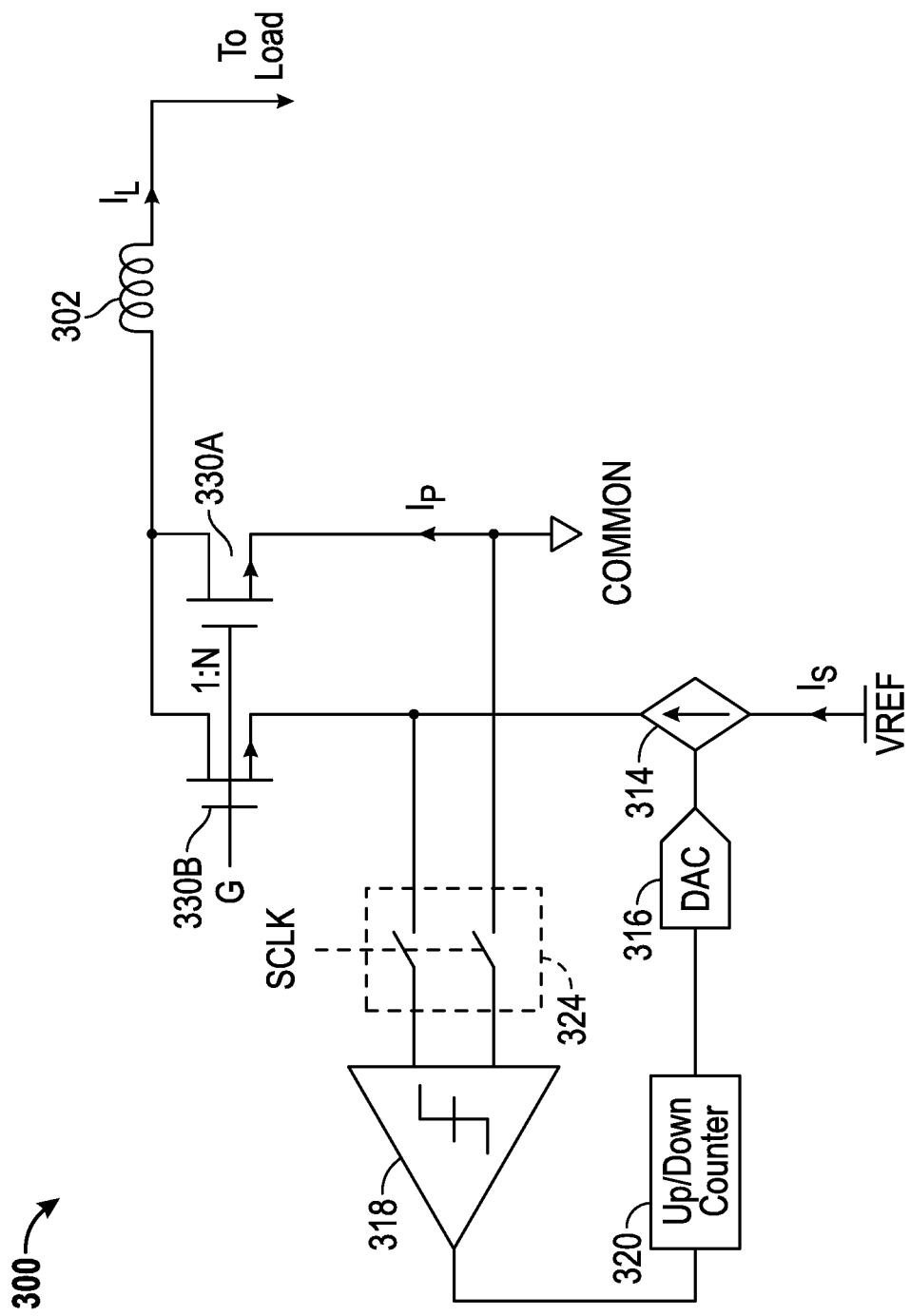
FIG. 3 illustrates generally an example of a portion of a DC/DC switching regulator circuit including a SenseFET portion.
Figure 5:
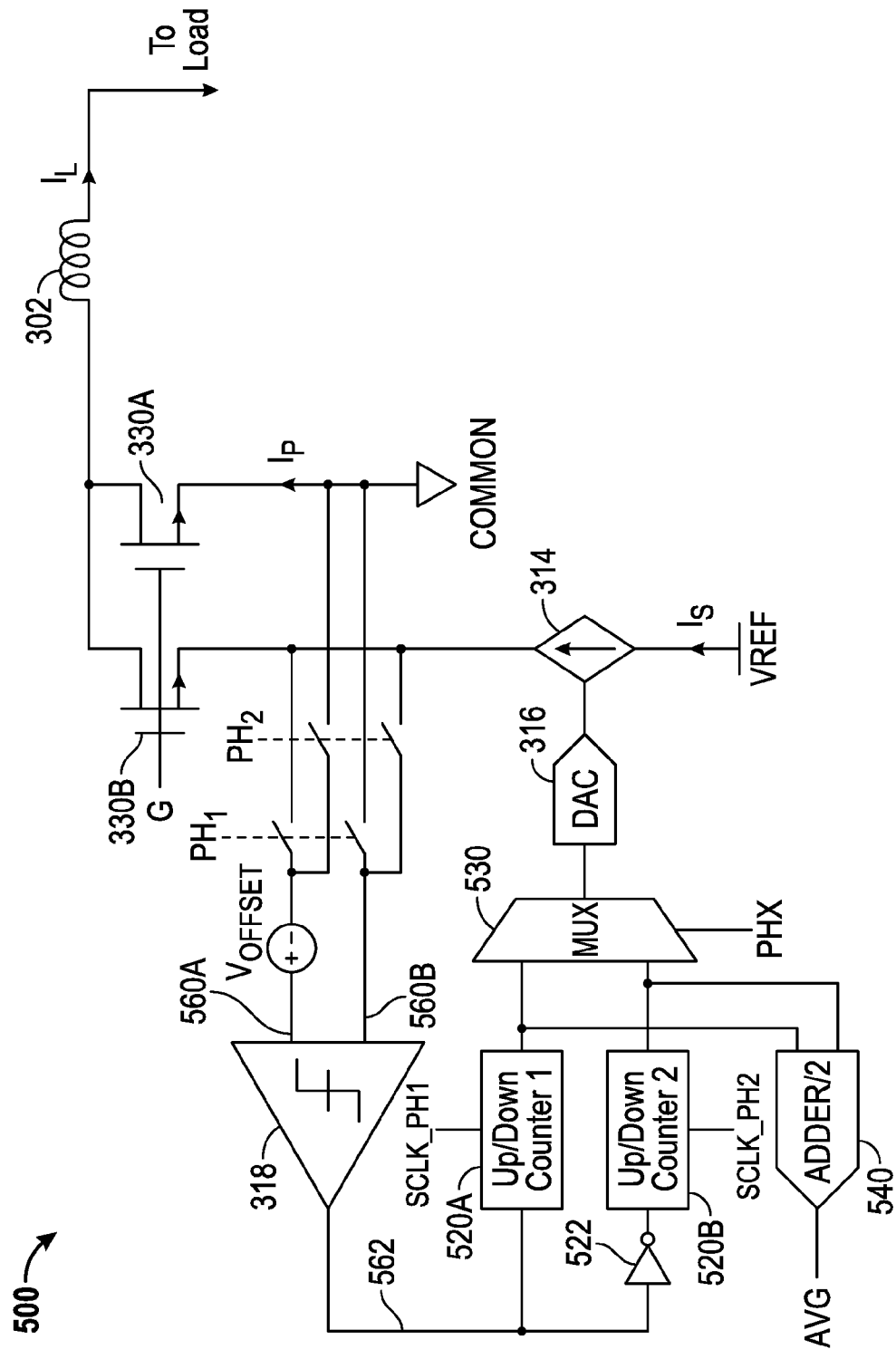
FIG. 5 illustrates generally an example of a portion of a DC/DC switching regulator circuit including a SenseFET portion and a comparator offset compensating configuration.

FIG. 2 illustrates generally an illustrative example of a SenseFET circuit configuration 200, such as can be included in the examples of FIG. 1, FIG. 3, or FIG. 5, for example. In the illustration of FIG. 2, a power switching device, $Q_P$, can include a Field Effect Transistor (FET), such as an N-channel Enhancement Mode FET. A source terminal $S_P$ of $Q_P$ can be coupled to a common or other reference node (such as the node COMMON shown in FIGS. 1, 3, and 5), and a drain terminal of $Q_P$ can be coupled to an energy storage device (or to another circuit or node for which a primary switched current $I_P$ will be coupled). The SenseFET configuration 200 can also include a sensing device $Q_S$, such as a second transistor. In the illustration of FIG. 2, $Q_S$ is also an N-channel Enhancement Mode FET. $Q_S$ can include a source terminal SS that can be coupled to another reference node, independent of the source terminal $S_P$ of $Q_P$. The gate terminals of $Q_S$ and $Q_P$ can be coupled together to provide a common gate terminal, G, and the drain terminals of $Q_S$ and $Q_P$ can be tied together to provide a common drain terminal $Q_D$. While the SenseFET example of FIG. 2 shows a "common drain" configuration the source terminal $S_S$ can be coupled to the source terminal $S_P$ of the power switching device $Q_P$ (e.g., a common source configuration), such as in an example where the drain terminals are not coupled together.

In the illustrative example of FIG. 2, width-to-length ratios (W/L) of $Q_S$ and $Q_P$ need not be the same. As a result, under a condition where a drain-to-source voltages across $Q_P$ is equal to a drain-to-source voltage across $Q_S$, the currents $I_P$ and $I_S$ can be proportional, such as corresponding to a ratio of width-to-length ratios. For example, if a width-to-length ratio of $Q_P$ can be "N" times as large as a width-to-length ratio of $Q_S$, so that the current $I_S$ is N times smaller than the current $I_P$, when the drain-to-source voltages across the devices are equalized. Such a ratio can be referred to as a 1:N ratio. Illustrative values of such ratios can include 1:100, 1:200, or 1:1000, or other values, for example.

The configuration shown in FIG. 2 can be included as a portion of a commonly-shared monolithic integrated circuit, such as a circuit including other portions of the regulator configurations shown in the examples of FIG. 1, 3, or 5. The configuration shown in FIG. 2 can be included in a separate power integrated circuit or integrated circuit package, such as in examples where a ratio between W/L ratios of $Q_S$ and $Q_P$ is to be tightly controlled, but where $Q_S$ and $Q_P$ are fabricated using a different integrated circuit fabrication process than is used for other portions of a regulator apparatus, for example.

FIG. 3 illustrates generally an example of a portion of a DC/DC switching regulator circuit 300 including a power switching field effect transistor (FET) 330A and a sensing FET 330B in a SenseFET configuration similar to the example of FIG. 2. In FIG. 3, such as during a discharge phase of operation, a current $I_P$ can flow between the source and drain terminals of the power FET 330A as energy stored in an inductor 302 is transferred to a load. The gate terminals of the FETs 330A and 330B can be coupled together, such as controlled by a control circuit according to a desired switching scheme in the example of a switching regulator.

In the configuration shown in FIG. 3, the drain terminals of the sensing FET 330B and the power FET 330A are coupled together. However, this is just one illustrative example. The operation described herein is also generally applicable to a common-source configuration where the source terminals of the FETs 330A and 330B are coupled together and the drain terminals are connected to separate nodes, such as in examples where a current is to be monitored in relation to a load or energy storage device connected to a source terminal of the power FET 330A. In such common-source examples, the respective drain terminals of the FETs 330A and 330B could be coupled to the comparator circuit 318, because the source terminals would be at the same potential. In this manner, the techniques illustrated in examples in this document can be used in other current-monitoring applications where a mirror-like configuration of transistors is used.

In the configuration shown in the example of FIG. 3, a source terminal of the power FET 330A is coupled to a first input of a comparator circuit 318, and a source terminal of the sensing FET 330B is coupled to a second input of the comparator circuit 318. The timing of such coupling (e.g., sampling) can be controlled by a sampling circuit 324, such as in response to a sample even trigger signal, SLCK. Because the drain terminals of the FETs 330A and 330B are coupled together, the comparator circuit 318 output can provide information indicative of a difference between the drain-to-source voltages of the power FET 330A and the sensing FET 330B. For example, if the drain-to-source voltage of the power FET 330A is greater than the drain-to-source voltage of the sensing FET 330B, an up/down counter circuit 320 can be triggered to increment a count provided to a digital-to-analog converter (DAC) 316, such as to increase a corresponding sensing current, $I_S$ established by a current source 314 coupled to the DAC 316.

Similarly, if the drain-to-source voltage of the power FET 330A is less than the drain-to-source voltage of the sensing FET 330B, the up/down counter circuit 320 can be triggered to decrement the count provided to the DAC 316, and the current through the sensing FET 330B will be correspondingly reduced. For each successive sampling cycle, the count can be adjusted, such as to establish a sensing current $I_S$ proportional to the current through the power FET 330A. The current $I_S$ approximates the current delivered to the load $I_L$. The timing of the sample event trigger signal can be adjusted, such as to converge $I_S$ on a current proportional to a desired portion of a load current waveform. As discussed elsewhere, sampling at around a mid-point of a discharge phase during switching regulator operation can provide an estimate of the average load current. Sampling during other instants can be used to estimate other load current values, such as another central tendency of load current or load current extrema, for example. The count provided by the up/down counter circuit 320 can then be used as digital representation of the estimated of the load current.

Figure 4A:
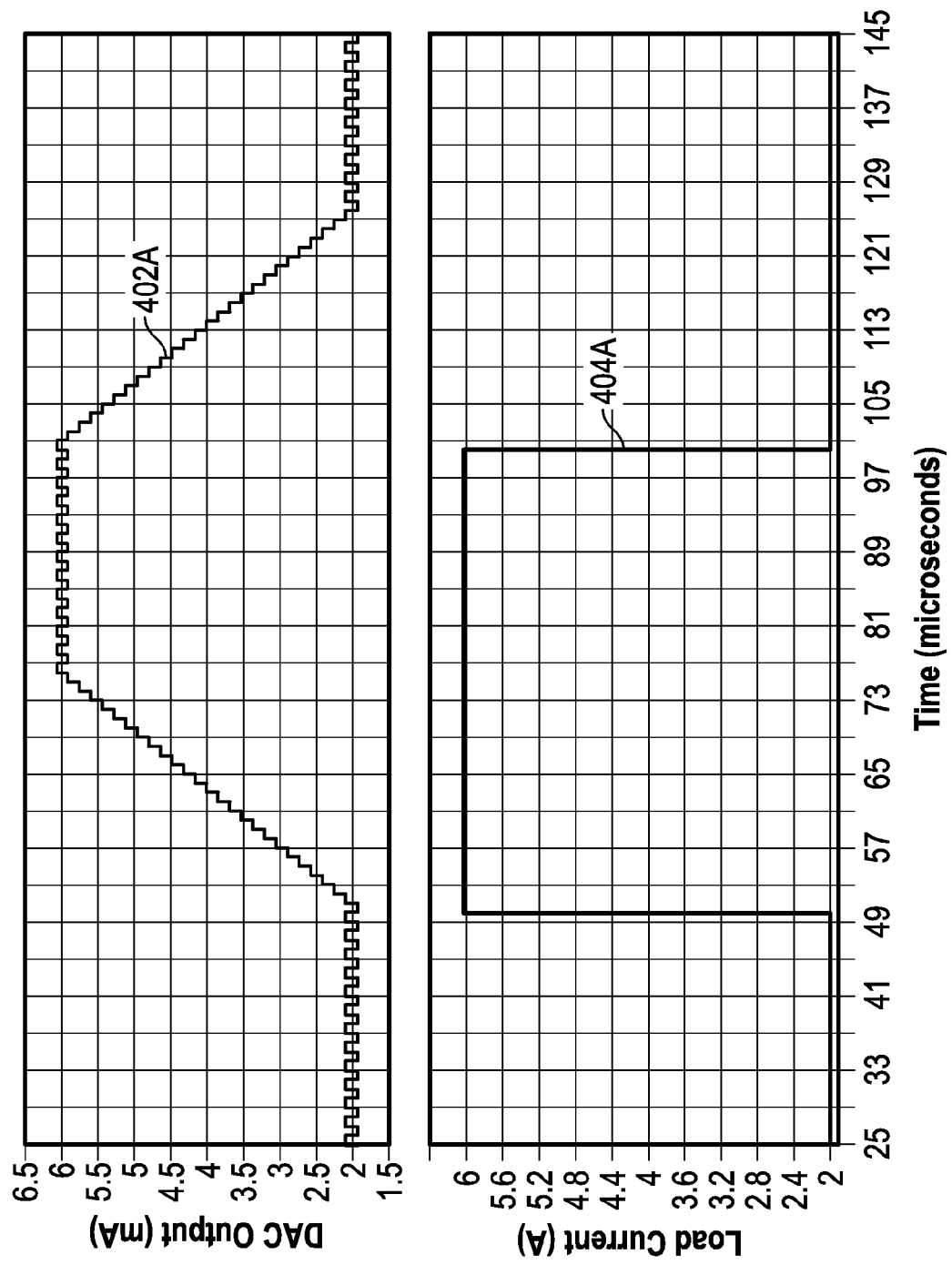
FIGS. 4A through 4C illustrate generally illustrative examples of simulations of the circuit configuration shown in FIG. 3, such as in response to various load current scenarios, including a discontinuous load current (e.g., FIG. 4A), a constant load current of 2 Amperes (A) (e.g., FIG. 4B), and a constant load current of 6 A (e.g., FIG. 4C).
Figure 4B:
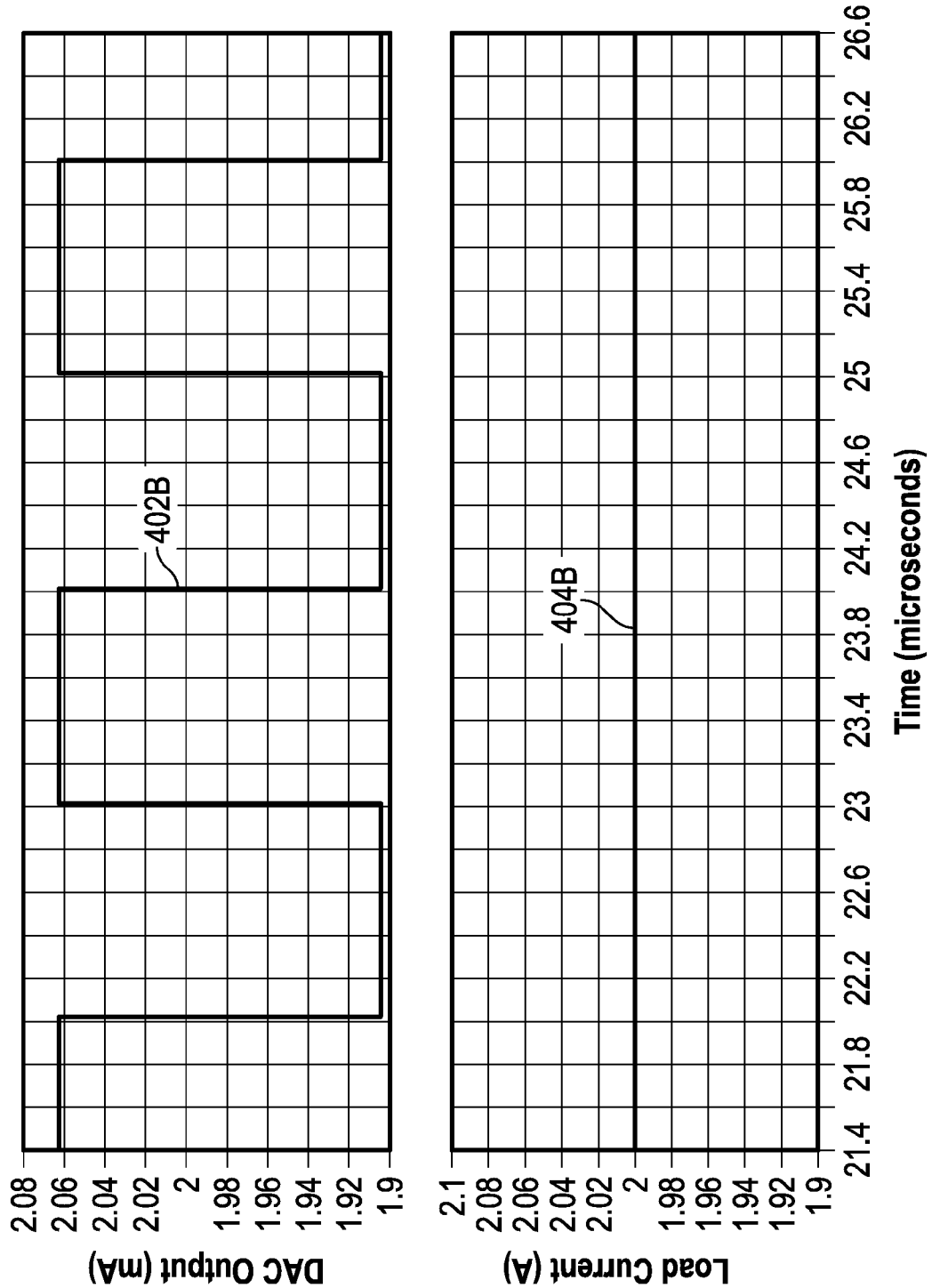
Figure 4C:
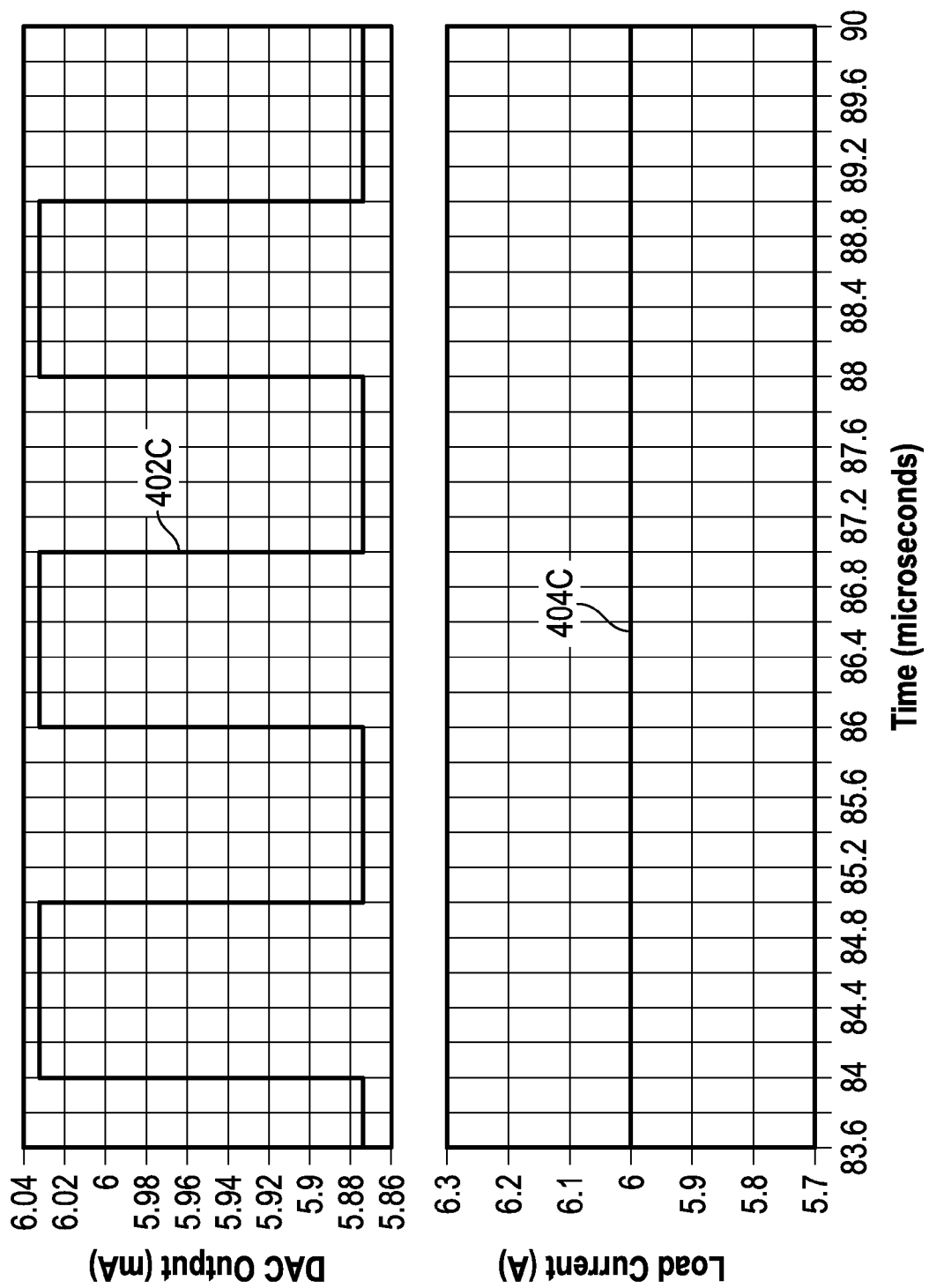

FIGS. 4A through 4C illustrate generally illustrative examples of simulations of the circuit configuration shown in FIG. 3, such as in response to various load current scenarios, including a discontinuous load current (e.g., FIG. 4A), a constant load current of 2 Amperes (A) (e.g., FIG. 4B), and a constant load current of 6 A (e.g., FIG. 4C). In the examples of FIGS. 4A through 4C, an output current of a digital-to-analog converter DAC and controlled current source is shown, such as established in response to a count from an up/down counter.

In the example of FIG. 4A, during an initial duration, a load current 404A of 2 A is simulated, and the corresponding DAC-controlled current source output 402A is toggling back-and-forth in a "dynamically stable" range in response to successive samples, to provide a sensing current of about 2 milliamps (mA), indicating a proportion of 1:1000 between a power field-effect transistor (FET) current a sensing FET current. Just after about 49 microseconds, the simulated load current 404A is abruptly increased to 6 A. The output of the DAC-controlled current source 402A slews and increases for each successive sample until converging on a new "dynamically stable" range corresponding to about 6 mA. Similarly, when the load current 404A is abruptly changed back to 2 A, the DAC-controlled current source 402A output again slews sample-by-sample towards a steady state value toggling around a value of about 2 mA.

A duration between adjacent samples as shown in FIGS. 4A through 4C can be longer than the switching frequency or pulse repetition rate of the switching supply. However, because of the finite quantized current increment between adjacent DAC counts, a duration including a number of samples can elapse before the DAC count converges on a sensed current proportional to the load current. Also, the load current shown in FIG. 404A corresponds to an average load current, and the selected sampling instant will affect whether the indicated DAC count represents an estimate of the average load current or some other value, as discussed in other examples herein.

FIG. 4B provides an illustration showing a zoomed-in view the dynamically-stable state mentioned above in relation to the example of FIG. 4A. In the example of FIG. 4B, the simulated load current 404B is held constant at 2 A, and the current provided by the DAC-controlled current source toggles between two quantized current levels just above and below 2 mA.

This behavior is expected, particularly for a simulation lacking noise or offset error, because the output values of the DAC-controlled current source are quantized by the resolution of the DAC, and the output of the comparator circuit will provide either an indication to increment or decrement a count provided to the DAC for every sampling cycle, if the comparator output is not gated or otherwise inhibited. Therefore, for a steady-state (e.g., constant) load, the comparator-driven feedback loop will toggle between values to maintain the sensing current at a value proportional to the current flowing through the power switching device, for example based on a difference between a voltage drop across the power switching device (e.g., $V_{DS}$) as compared to a voltage across the sensing device. FIG. 4C similarly illustrates a zoomed-in view of the dynamically stable state mentioned above, but this time showing a load current 404C of 6 A, and a corresponding output of the DAC-controlled current source 402C toggling around a sensed current value of about 6 mA.

FIG. 5 illustrates generally an example of a portion of a DC/DC switching regulator circuit 500 including a SenseFET portion and a comparator offset compensating configuration. Generally, the circuit 500 can operate according to principles similar to the example of the circuit 300 of FIG. 3, but with modifications to compensate for an offset error voltage, $V_{OFFSET}$. For example, as an illustration, such an offset voltage $V_{OFFSET}$ can be modeled as appearing in series with a first input 560A of a comparator circuit 318. As in the example of FIG. 3, an electrical parameter such as a voltage at a drain terminal of a power field-effect transistor (FET) 330A can be coupled to the comparator circuit 318, such as for comparison with an electrical parameter such as a voltage at a drain terminal of a sensing FET 330B. Unlike the example of FIG. 3, the example of FIG. 5 includes additional switches controlled by respective sample event trigger signals, PH1 (e.g., phase 1) and PH2 (e.g., phase 2). In a first mode, such as in response to a first sample trigger signal PH1, the drain terminals of the FETs 330A and 330B can be coupled to the inputs 560A and 560B of the comparator circuit 318 to provide a first sampling polarity.

An output 562 of the comparator circuit 318 can be coupled to one or more bidirectional counters, such as a first up/down counter circuit 520A. A first counter trigger signal, SCLK_PH1, can enable the first up/down counter circuit 520A to increment or decrement in response to the comparator output 562 when the comparator circuit 318 is coupled to the FETs 330A and 330B using the first sampling polarity. A multiplexer (MUX) 530 can be used to select an output of the first up/down counter circuit 520A for coupling a first count to a digital-to-analog converter (DAC) 316, such as in response to a sampling polarity selection signal PHX. The first count can be used by the DAC 316 to establish a bias condition of the sensing FET 330B using a controlled current source 314. This series of events can be referred to as a first sampling cycle, wherein the first sampling polarity is provided to the comparator circuit 318, the first up/down counter circuit 520A is incremented or decremented, and a first count of the first up/down counter circuit 520A is used to establish the sensing current $I_S$.

A second sampling cycle in a second mode can be used, such as to flip a polarity of the offset contribution from VOFFSET. In the example of a second mode, a second sample trigger signal PH2 can be used to control switches to reverse the polarity of the respective connections between the drain terminals of the FETs 330A and 330B and the inputs 560A and 560B of the comparator circuit 318 as compared to using PH1. The output 562 of the comparator circuit 318 can be coupled to another bidirectional counter, such as a second up/down counter circuit 520B having an inverted input (e.g., provided by an inverter 522). The second up/down counter circuit 520B can be triggered or otherwise enabled using a second counter enable signal, SCLK_PH1, such as to increment or decrement the second up/down counter circuit 520B. The MUX 530 can provide a second count from the second up/down counter circuit 520B to the DAC 316, to control the current source 314.

The first and second counts from the first and second up/down counter circuits 520A and 520B can be coupled to an averaging circuit 540. For example, the averaging circuit 540 can add the first and second counts together to provide a sum, and divide the sum by two. In this manner, if the first and second sampling modes are used alternatively for successive sampling cycles (e.g., every other cycle), or for successive groups of sampling cycles, an error contribution from $V_{OFFSET}$ can be canceled in an output of the averaging circuit 540, AVG, such as to provide an offset-compensated digital representation of an average load current. This offset cancellation technique generally takes into consideration that the use of FETs 330A and 330B in a linear (e.g., ohmic) region of operation provide drain current generally proportional to $V_{DS}$.

FIGS. 6A and 6B illustrate generally an example of a simulation of the circuit configuration shown in FIG. 5, such as in response to a discontinuous load current. During a duration from 0 to 50 microseconds, a load current 604 of 2 A is simulated (e.g., as shown in FIG. 6B). An output current 602 of a digital-to-analog converter (DAC) and controlled current source is shown in FIG. 6A, such as established in response to counts from first and second up/down counter circuits. At about 20 microseconds, a comparator circuit input offset is included, and appears in the output current 602, but the output current 602 remains centered around 200 milliamps (mA), corresponding to a ratio of 1:10 between the load current and the controlled source current. The sampling polarity is flipped every other sampling cycle, and in a region 606, the output current 602 toggles back and forth around 200 mA during constant load, with the offset contribution added or subtracted every other cycle depending on the sampling polarity. At 50 microseconds, the simulated load current 604 is increased to 6 A, and the corresponding output current 602 of the DAC increases seeking to converge on about 600 mA. At 100 microseconds, the load current 604 is reduced to 2 A, and the output current 602 again ramps downwards for each successive sample seeking to converge on about 200 mA.

Figure 7:
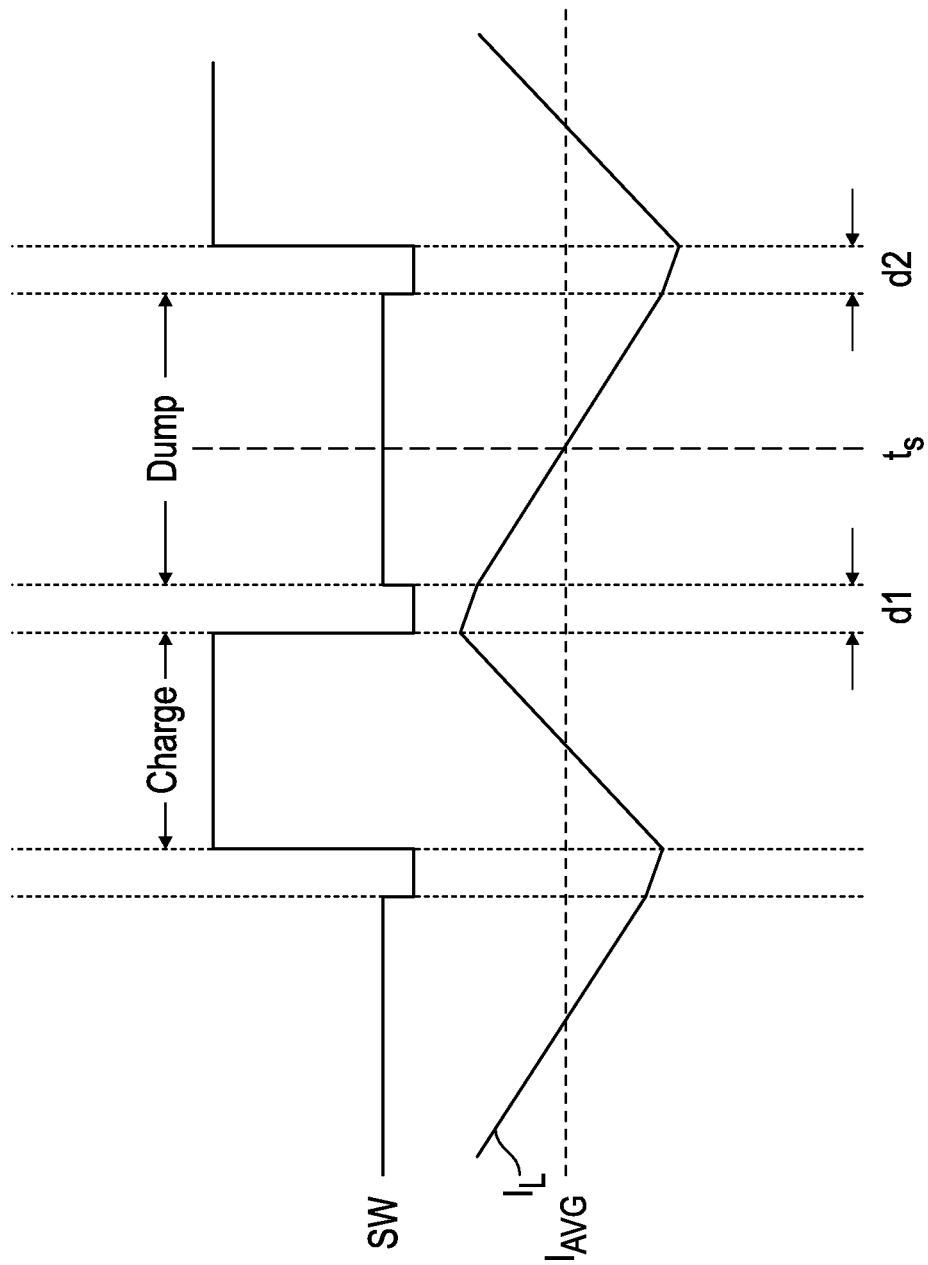
FIG. 7 illustrates generally an illustrative example of a switching signal, SW, and an inductor current waveform, such as corresponding to an inductor current for the examples of FIG. 1, 3, or 5.

FIG. 7 illustrates generally an illustrative example of a switch control signal, SW, and an inductor current waveform, $I_L$, such as corresponding to an inductor current for the switching regulator examples of FIG. 1, 3, or 5. During a phase labeled "Charge," energy is stored in the inductor such as using a series transistor switch between a voltage input and a first terminal of the inductor, controlled using the switch control signal, SW. If a constant voltage is applied, the inductor current will increase linearly. During a phase labeled "Dump," the series switch is disconnected and a shunt transistor switch is closed to complete a circuit including the inductor and the load, in response to the switch control signal, SW. The present inventor has also recognized, among other things, that a sample trigger can be generated corresponding to a mid-point, $t_s$, during a discharge or "dump" phase of switching regulator operation. If the dead times, d1 and d2 are equal in duration, then the mid-point, $t_s$, corresponds to an average load current. If a duration or instant of such a mid-point can be estimated or detected, a resulting sample trigger signal can be used such as to trigger sampling by the comparator circuits of the examples of FIG. 1, 3, or 5. In this manner, a count provided by the counter circuits of FIG. 1, 3, or 5 will converge on a value representative (e.g., proportional) to an average load current.

Figure 8:
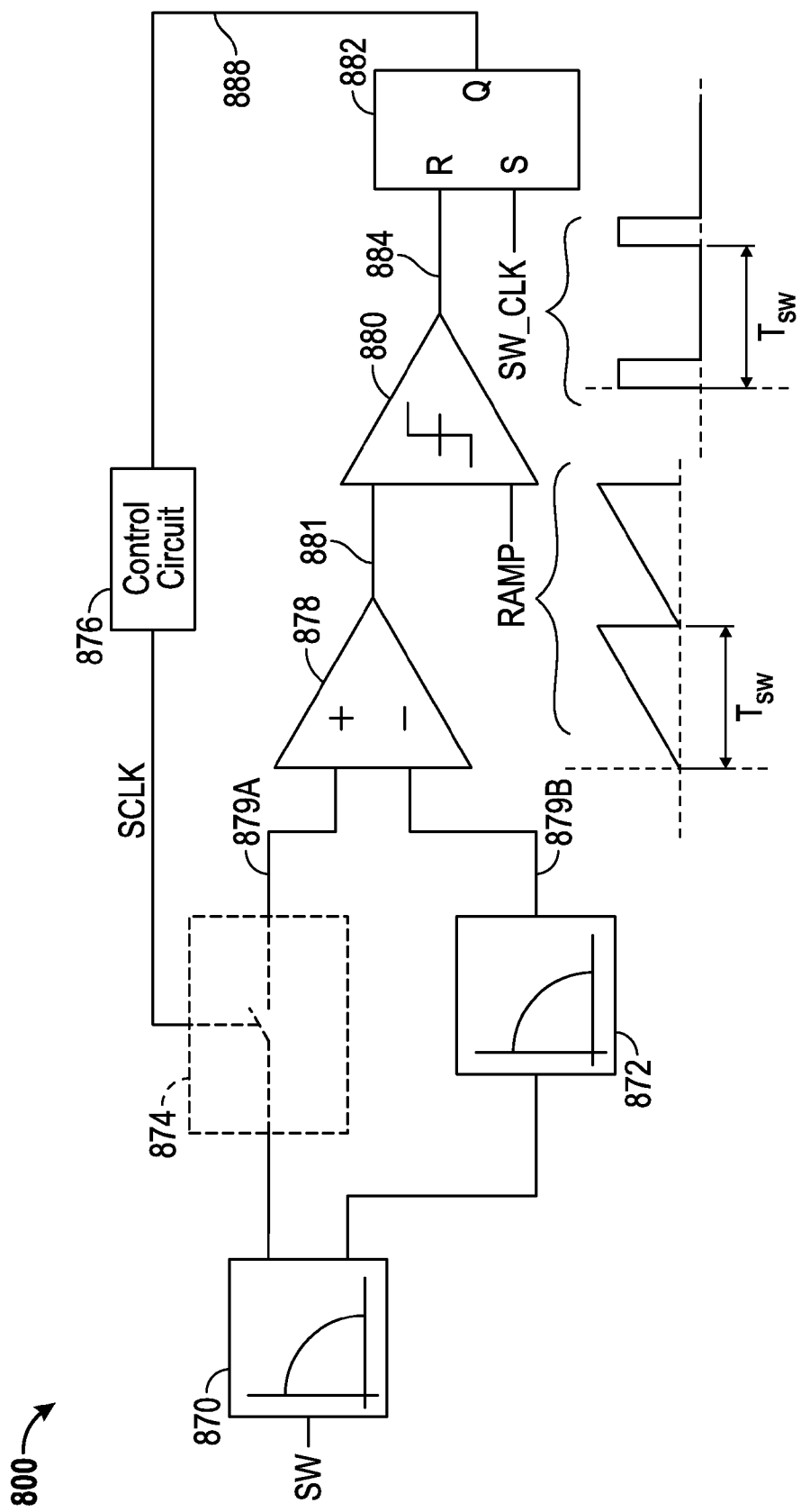
FIG. 8 illustrates generally an illustrative example of an inductor current mid-point estimation circuit, such as can be used to trigger sampling circuits or otherwise control a portion of the regulator circuits shown in the examples of FIG. 1, 3, or 5.

FIG. 8 illustrates generally an illustrative example of an inductor current mid-point estimation circuit, such as can be used to trigger sampling circuits or otherwise control a portion of the regulator circuits shown in the examples of FIG. 1, 3, or 5. In general, the configuration of FIG. 8 can provide load current mid-point estimation that compensates for propagation or loop delay, but without requiring direct monitoring of the inductor current or load current waveform.

A switch control signal, SW, such as shown in FIG. 7 can be provided to a first filter circuit 870. The first filter circuit 870 can include a low-pass filter such as having a cutoff frequency corresponding to a multiple of a switching frequency of the switch control signal, SW. For example, if a frequency or repetition rate of pulses of the switch control signal is about 1 megahertz (MHz), then the first filter circuit 870 can have a cutoff frequency of about several MHz. The filtered signal from the first filter circuit 870 can then be provided to a second filter circuit 872. The second filter circuit 872 can include a low-pass filter having a cutoff frequency below the frequency or repetition rate of the switch control signal, such as to provide a filtered signal indicative of an estimated average of the switch control signal. The output of the first filter circuit 870 can also be coupled to a sampling circuit 874. The sampling circuit 874 can provide an output 879A to a first input of a differential amplifier circuit 878 (or other circuit) when a sample control input, SLCK, is asserted, and the output of the second filter circuit 872 can be provided to second input 879B of the differential amplifier circuit 878. The sampling circuit can include a switched-capacitor configuration, such as shown in the example of FIG. 9.

An output 881 of the differential amplifier 878 can be coupled to a first input of a comparator circuit 880, and a second input of the comparator circuit 880 can be coupled to a ramp signal having a period $T_{sw}$ corresponding to (e.g., equal or approximating) a period of the switch control signal, SW. An output 884 of the comparator can be used to reset a latch circuit 882. For example, the latch circuit 882 can be set by a clock signal, SW_CLK, such as having successive rising edges corresponding to a switch control signal period, $T_{sw}$. For example, for each regulator switch control cycle, the latch can be set (e.g., a "high" state). An output of the latch circuit 882 can remain in a logic "high" state until the latch is reset by the comparator output 884. A transition from logic "high" to logic "low" at the latch circuit output 886 can indicate an instant corresponding to an estimated mid-point of an inductor load current waveform. The latch circuit output 886 can be used at least in part to provide a sample trigger signal for the load current readback schemes illustrated in FIG. 1, 3, or 5, or for other use such as for generation of the sample control signal, SLCK for the next cycle in order to compensate for propagation delay.

Figure 9:
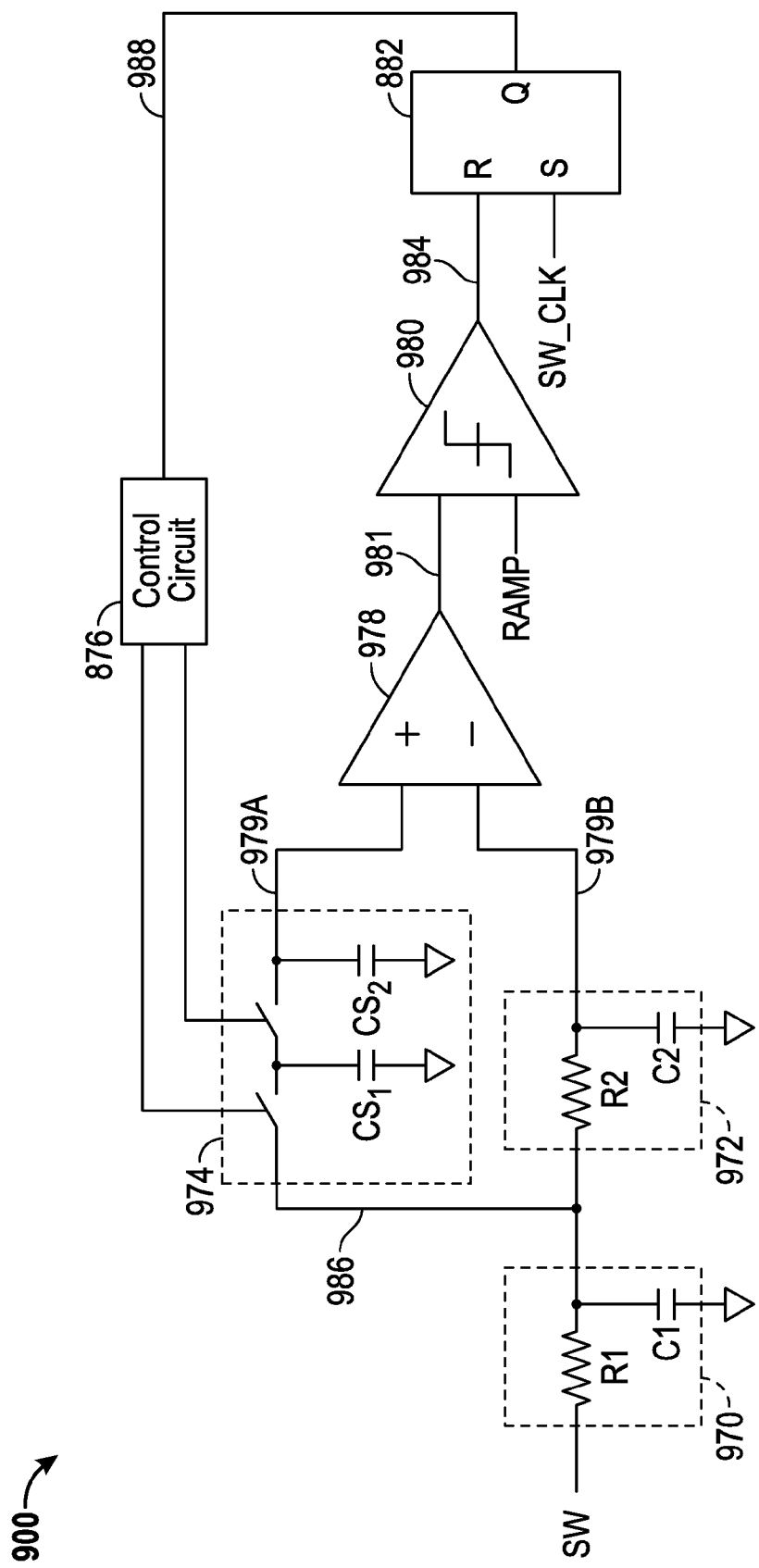
FIG. 9 illustrates generally an illustrative example of an inductor current mid-point estimation circuit similar to the example of FIG. 8, including a two-capacitor sampling circuit, and first and second RC filter circuits.

FIG. 9 illustrates generally an illustrative example of an inductor current mid-point estimation circuit similar to the example of FIG. 8, including a switched capacitor sampling circuit, and first and second RC filter circuits. In the illustration of FIG. 9, a first filter circuit 970 can include an RC network including a series resistor R1 and a shunt capacitor C1. As mentioned above, a cutoff frequency of the low-pass configuration can be a multiple of a switching regulator switching frequency. An output 986 of the first filter circuit 970 can be provided to a sampling circuit 974, including a two-capacitor configuration or other configuration. A first switch can be triggered by a control circuit 876 to store a sample of the output of the first filter circuit 970 on a first sampling capacitor CS1, and a second switch can be triggered to transfer a sampled level from the first sampling capacitor to the second sampling capacitor CS2, and to a first input 979A of a differential amplifier circuit 978.

The output 986 of the first filter circuit 970 can be further filtered using a second RC network including a second series resistor R2 and a second shunt capacitor C2, such as to establish a second low-pass configuration having a cutoff frequency below the switching frequency of the switching regulator. An output 979B of the second filter circuit 972 can be provided to a second input of the differential amplifier circuit 978. As in the example of FIG. 8, an output 981 of the differential amplifier circuit 978 can be provided to an input of a comparator circuit 980, and a second input of the comparator circuit can be coupled to a ramp signal having a period corresponding to a period of the switching regulator switch control signal, SW. An output of the comparator circuit 980 can be provided to an input (e.g., a reset input) of a latch circuit 882. A clock signal, SW_CLK, corresponding to the switch control signal, SW, can be provided to another input of the latch circuit 882. In this manner, an output 986 of the latch circuit can provide a level transition (e.g., a high-to-low transition) to indicate an estimated mid-point of a load current, such as for use in triggering or controlling other circuits. The differential amplifier circuit 978 of the examples of FIGS. 8 and 9 need not be a high-speed differential amplifier. For example, the differential amplifier circuit 978 can include a bandwidth similar to the pass-band of the first filter circuit 970. For example, the differential amplifier can be configured with a high loop gain in an integrating configuration, to produce the waveforms as shown in the illustrative example of FIGS. 10A and 10B.

Figure 10A:
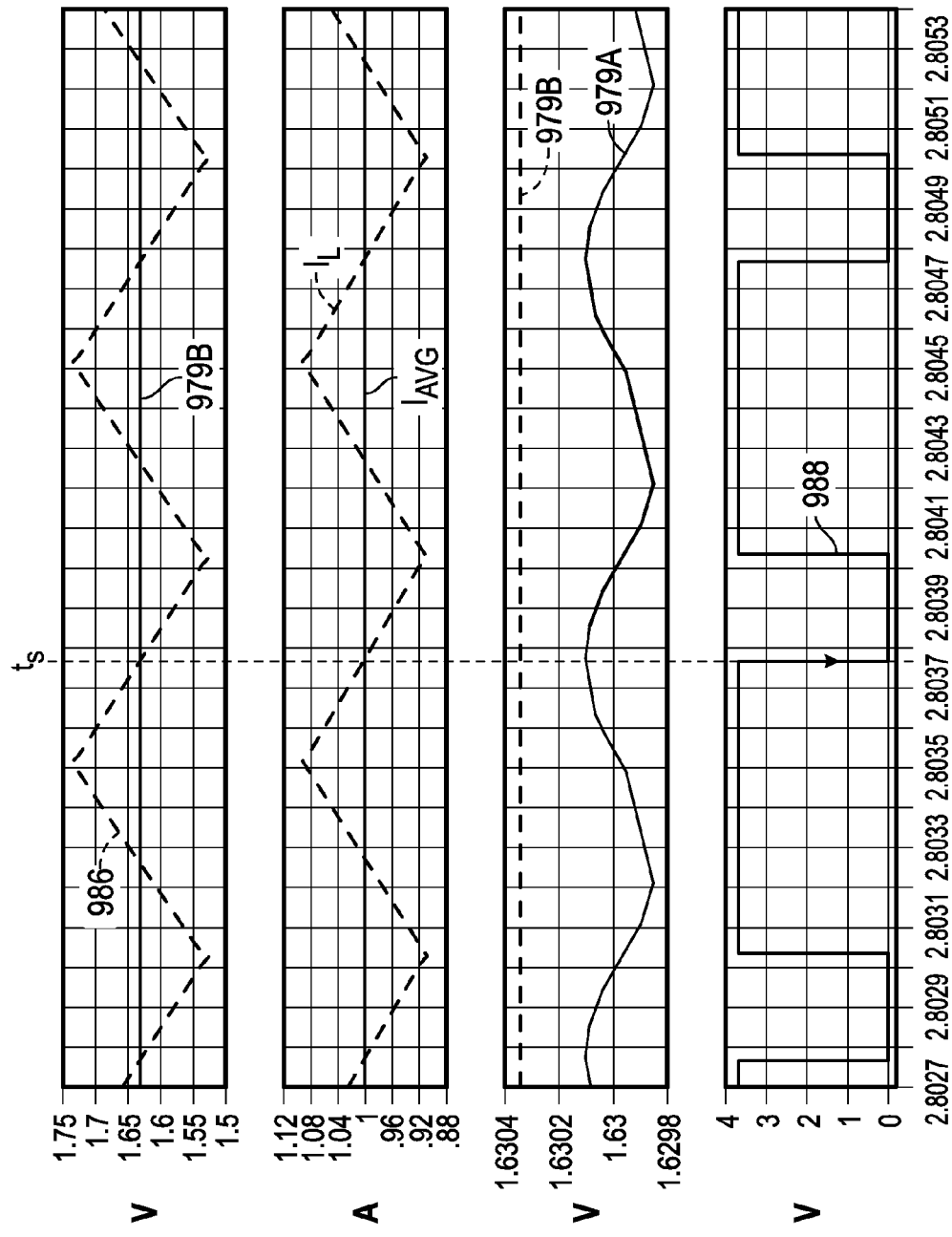
FIGS. 10A and 10B illustrate generally illustrative examples of simulations of the circuit configuration of FIG. 9, including a comparison between a simulated inductor current waveform and an average inductor current, versus an estimated inductor current waveform representation and an estimated inductor current mid-point determined using the estimated inductor current waveform representation.
Figure 10B:
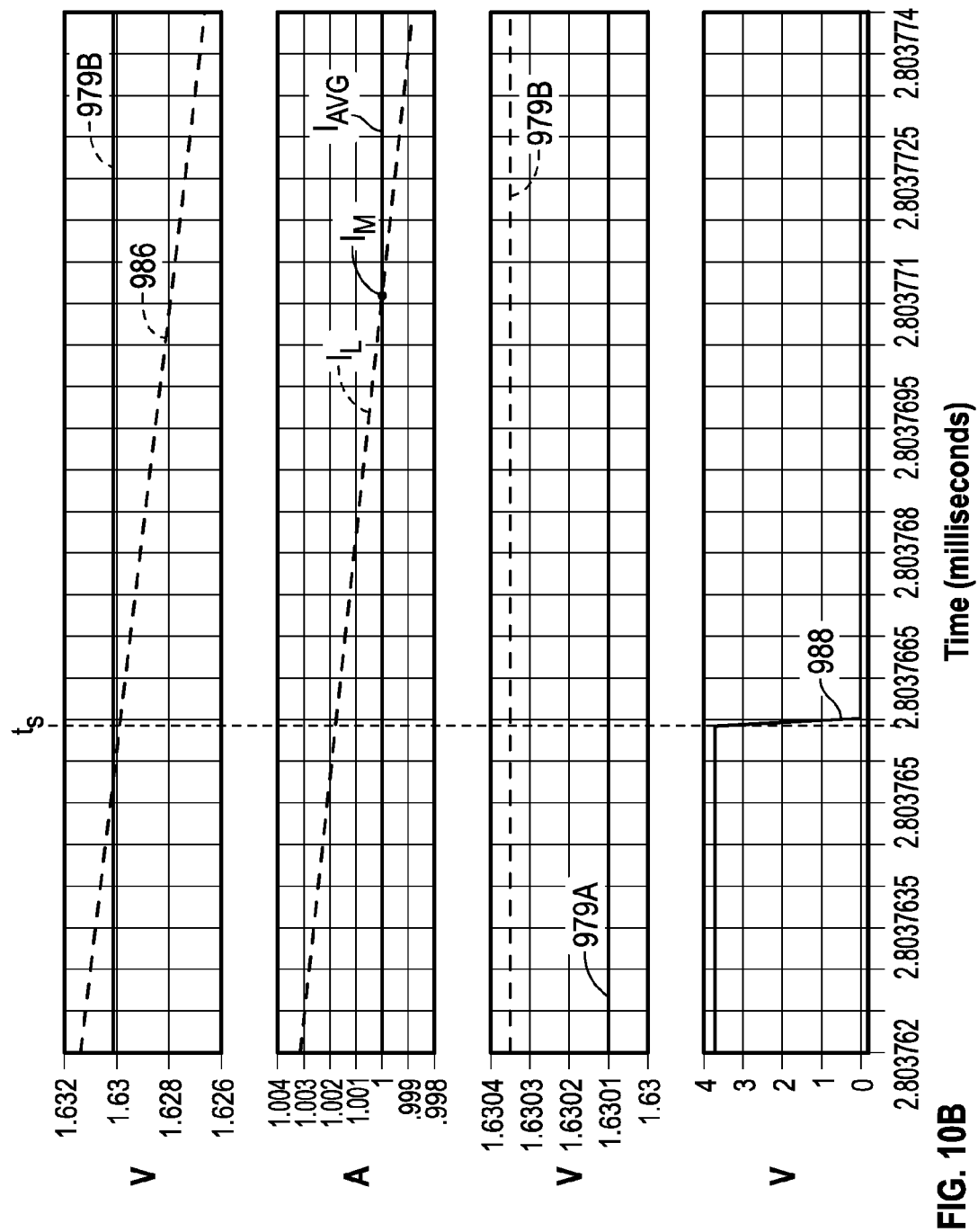

FIGS. 10A and 10B illustrate generally illustrative examples of simulations of the circuit configuration of FIG. 9, including a comparison between a simulated inductor current waveform and an average inductor current, versus an estimated inductor current waveform representation and an estimated inductor current mid-point determined using the estimated inductor current waveform representation. FIG. 10A shows a zoomed-out view, and FIG. 10B shows a zoomed-in view of similar simulation results. In particular, FIG. 10B illustrates generally that the estimated inductor discharge current mid-point established at instant $t_s$ is offset in time cycle from the simulated actual inductor current mid-point, $I_M$, resulting in a modest amplitude error of about 0.15% between the inductor current at the instant of sampling, $t_s$, as compared to the simulated actual current at the mid-point, $I_M$. In FIGS. 10A and 10B, an output 986 of the filter circuit 970 shown in FIG. 9 includes a triangular-shaped waveform similar to the inductor current waveform, $I_L$. An output 979B of the second filter circuit 972 shows an estimated average of the output 986 of the filter circuit, because the second filter circuit 972 can have a time constant much larger than a time constant of the first filter circuit 970, for example. The estimated average is also similar to an average simulated load current, $I_{AVG}$. In this manner, the filtered outputs 986 and 979B can be used to estimate a mid-point in the inductor current waveform, such as during a discharge or "dump" phase of regulator operation, without having to monitor inductor current directly.

The output 979B can be provided to an inverting input of a differential amplifier (e.g., differential amplifier circuit 978 as shown in FIG. 9), and a first input 979A (e.g., a non-inverting input) to the differential amplifier can be provided by a switched capacitor circuit. As discussed in relation to FIG. 9, the output of the differential amplifier can be compared to a saw-tooth waveform that is reset every switching cycle of the regulator circuit, and when the difference between the filter output 979B and the switched capacitor sample signal provided to input 979A is less than the saw-tooth waveform level, an output 988 of an SR latch can be reset. This falling edge can be used to trigger other events, such as to trigger a sample event or can otherwise be used to provide a sample trigger signal, $t_s$, as referred to in the examples of FIG. 1, 3, or 5.

For example, the sample event can cause voltages across a sensing device and a power switching device to be compared, and in response a bias condition of the sensing device can be adjusted to establish a current through the sensing device that is proportional to a current through the power switching device, during a specified interval or instant, such as corresponding to an instant where an instantaneous inductor current is about the same as an average load current. The techniques shown and discussed in relation to FIGS. 8-9, and 10A-10B, or 11 can be used to estimate a mid-point of an inductor current waveform, in order to trigger sampling to obtain an estimate of an average load current.

Figure 11:
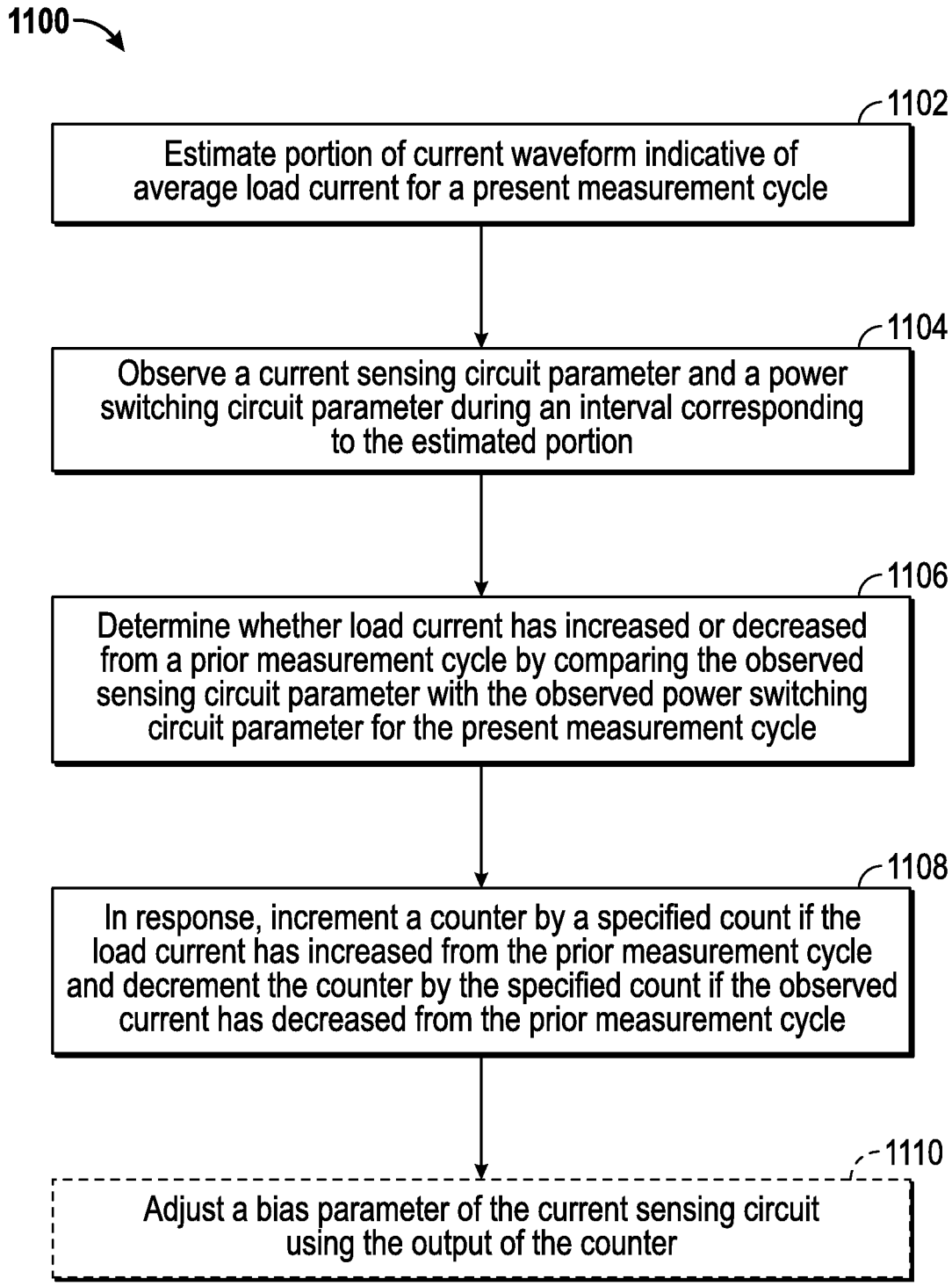
FIG. 11 illustrates generally a technique, such as a method, for performing current readback including estimating a portion of a load current waveform indicative of average load current.

FIG. 11 illustrates generally a technique 1100, such as a method, for performing current readback including estimating a portion of a current waveform (e.g., an inductor current waveform) indicative of an average load current. At 1102, the portion of a current waveform indicative of average load current, or another central tendency, can be estimated. For example, a mid-point of an inductor discharge or "dump" phase of switching regulator operation can be estimated, corresponding approximately to an average load current. At 1104, a current sensing circuit parameter can be observed and a power switching circuit during an interval or instant corresponding to the estimated mid-point of the load current waveform. Such a current sensing circuit can include a field-effect transistor (FET) coupled to a power switching FET, and the observed parameter can include a drain-to-source voltage or other voltage, such as to provide information indicative of a voltage drop across the switched terminals of the FET.

At 1106, the observed sensing circuit parameter and power switching circuit parameters can be compared, such as to determine whether the load current has increased or decreased from a prior measurement cycle. At 1108, in response, a digital counter circuit can be incremented by a specified count (e.g., a single count) if the load current has increased from a prior measurement cycle or decremented by the specified count if the load current has decreased from the prior measurement cycle.

At 1110, a bias parameter of the current sensing circuit can be adjusted using the output of the counter. For example, a drain current for a sensing FET can be adjusted using a controlled current source as discussed in other examples herein. For example, over a series of measurement cycles, when the VDS voltages developed across the sensing FET and the power switching FET are roughly equalized, a drain current established through the sensing FET will be proportional to a current carried through the power switching FET. A count provided by the digital counter circuit can provide a digital representation of the current flowing through the sensing FET, and thereby the current flowing through the power switching FET can be determined using information about the specified proportion between the sensing FET current and the power switching FET current (e.g., a ratio).

ADDITIONAL NOTES

Each of the non-limiting examples discussed in this document can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A switching regulator apparatus for load current monitoring to provide a digital representation of an estimated load current, comprising:
   a first counter circuit including and input and a digital output;
   a comparator circuit including:
      a first input selectively coupleable to a power switching device, the power switching device configured to conduct current for delivery to the load;

a second input selectively coupleable to a sensing device; and
an output coupled to the input of the first counter circuit; and
a digitally-controlled source coupled to the output of the first counter circuit and configured to adjust a bias condition of the sensing device in response to a first count provided by the first counter circuit in order to establish a proportional relationship between a current conducted by the sensing device and a corresponding current conducted by the power switching device;
wherein the first counter is configured to increment and decrement the first count in response to information provided by the comparator output about a comparison between the first and second inputs of the comparator; and
wherein the count is indicative of the estimated load current.

2. The apparatus of claim 1, wherein the first input of the comparator is selectively coupleable to the power switching device and the second input of the comparator is selectively coupleable to the sensing device in response to a sample trigger signal corresponding to an interval in which an instantaneous load current is about the same as a central tendency of the load current.

3. The apparatus of claim 2, comprising a load current mid-point estimation circuit configured to identify a locus of a time-varying waveform indicative of the central tendency of the load current to generate the sample trigger signal.

4. The apparatus of claim 3, wherein the sample trigger signal includes an interval between successive pulses that is greater than a switching cycle interval of the power switching device.

5. The apparatus of claim 3, wherein the load current mid-point estimation circuit includes:
a first filter configured to low pass filter a pulsed signal having a period between pulses corresponding to a switching cycle interval of the power switching device, the first filter including a cutoff frequency above a frequency corresponding to the switching cycle interval;
a second filter configured to low pass filter the pulsed signal and having a cutoff frequency below the frequency corresponding to the switching cycle interval;
a differential amplifier circuit configured to provide an output corresponding to a difference between the outputs of the first and second filters;
a comparator circuit including a first input coupled to the differential amplifier circuit and a second input coupled to a ramp signal having a repetition period corresponding to the switching cycle interval;
wherein a state change of the output of the comparator circuit is used at least in part to provide the sample trigger circuit signal.

6. The apparatus of claim 5, wherein an input to the second filter is coupled to an output of the first filter.

7. The apparatus of claim 5, wherein an output of the first filter is selectively coupleable to an input of the differential amplifier circuit through a sampling circuit.

8. The apparatus of claim 2, wherein the central tendency of the load current comprises an average load current; and
wherein the instantaneous load current corresponding to the average load current includes a locus in time or amplitude of a discharge switching phase of the switching regulator corresponding to about a mid-point in time or amplitude of the discharge switching phase.

9. The apparatus of claim 1, wherein the first input of the comparator is selectively coupleable to the power switching device and the second input of the comparator is selectively coupleable to the sensing device, corresponding to a first sampling polarity; and
wherein the first input of the comparator is selectively coupleable to the sensing device and the second input of the comparator is selectively coupleable to the power switching device, corresponding to a second sampling polarity.

10. The apparatus of claim 9, comprising:
a second counting circuit coupled to the output of the comparator circuit; and
wherein the first counter is configured to increment or decrement the first count in response to information provided by the comparator output when the comparator inputs are configured to use the first sampling polarity;
wherein the second counter is configured to increment or decrement a second count in response to information provided by the comparator output when the comparator inputs are configured to use the second sampling polarity.

11. The apparatus of claim 10, comprising a multiplexer including:
a first input coupled to the digital output of the first counter;
a second input coupled to a digital output of the second counter; and
an output;
wherein the output of the first counter and second counters are selectively coupleable to the digitally-controlled source using the multiplexer.

12. The apparatus of claim 10, comprising an averaging circuit;
wherein the digital outputs of the first and second counters are coupled to the averaging circuit; and
wherein the averaging circuit includes a digital output configured to provide an average of the counts provided by the digital outputs of the first and second counters to suppress or inhibit a differential offset error of the comparator circuit.

13. The apparatus of claim 1, wherein the power switching device and the sensing device comprise Field Effect Transistors (FETs).

14. The apparatus of claim 13, wherein first input of the comparator is configured to obtain information indicative of a drain-to-source voltage drop across the power switching device; and
wherein the second input of comparator is configured to obtain information indicative of a drain-to-source voltage drop across the sensing device.

15. The apparatus of claim 14, wherein the power switching device comprises a source terminal coupled to a first node;
wherein the sensing device comprises a source terminal coupled to a different node than the first node; and
wherein the power switching device and the sensing device each include a drain terminal; and
wherein the drain terminals are connected to each other and to a node of an energy storage device.

16. The apparatus of claim 15, further comprising the energy storage device;
wherein the energy storage device includes an inductor.

17. The apparatus of claim 1, further comprising the power switching device and the sensing device.

18. The apparatus of claim 17, wherein the power switching device and the sensing device are located together within an integrated circuit device or within an integrated circuit package.

19. A switching regulator apparatus for load current monitoring to provide a digital representation of an estimated load current, comprising:
- a first counter circuit including and input and a digital output;
- a comparator circuit including a first input selectively coupleable to a power switching device and a second input of the comparator selectively coupleable to the sensing device in response to a sample trigger signal corresponding to an interval in which an instantaneous load current is about the same as a central tendency of the load current, and an output coupled to the input of the first counter circuit; and
- a digitally-controlled source coupled to the output of the first counter circuit and configured to adjust a bias condition of the sensing device in response to a first count provided by the first counter circuit in order to establish a proportional relationship between a current conducted by the sensing device and a corresponding current conducted by the power switching device;
- wherein the first counter is configured to increment and decrement the first count in response to information provided by the comparator output about a comparison between the first and second inputs of the comparator; and
- wherein the central tendency of the load current comprises an average load current;
- wherein the count is indicative of an estimated average load current; and
- wherein the first input of the comparator is configured to obtain information indicative of a voltage drop across the power switching device; and
- wherein the second input of comparator is configured to obtain information indicative of a voltage drop across the sensing device.

20. A method for estimating a load current delivered to a load coupled to a switching regulator apparatus, comprising:
- comparing an electrical parameter obtained from a power switching device with an electrical parameter obtained from a sensing device;
- providing the comparison to a counter circuit, the counter circuit providing a first count using a digital output;
- incrementing and decrementing the first count of the counter circuit in response to information about the comparison;
- controlling a digitally-controlled source to adjust a bias condition of the sensing device in response to the first count in order to establish a proportional relationship between a current conducted by the sensing device and a corresponding current conducted by the power switching device; and
- using the first count, providing information indicative of the estimated load current.

* * * * *